United States Patent
Flowers et al.

(10) Patent No.: US 11,164,091 B1
(45) Date of Patent: Nov. 2, 2021

(54) NATURAL LANGUAGE TROUBLESHOOTING ENGINE

(71) Applicant: STATE FARM MUTUAL AUTOMOBILE INSURANCE COMPANY, Bloomington, IL (US)

(72) Inventors: Elizabeth Flowers, Bloomington, IL (US); Puneit Dua, Bloomington, IL (US); Eric Balota, Bloomington, IL (US); Shanna L. Phillips, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 983 days.

(21) Appl. No.: 15/495,678

(22) Filed: Apr. 24, 2017

Related U.S. Application Data

(60) Provisional application No. 62/368,548, filed on Jul. 29, 2016, provisional application No. 62/368,271, filed on Jul. 29, 2016, provisional application No. 62/368,298, filed on Jul. 29, 2016, provisional application No. 62/368,332, filed on Jul. 29, 2016, provisional application No. 62/368,359, filed on Jul. 29, 2016, provisional application No. 62/368,406, filed on Jul. 29, 2016, provisional application No. 62/368,448, filed on Jul. 29, 2016, provisional application No. 62/368,503, filed on Jul. 29, 2016, provisional application No. 62/368,512, filed on Jul.

(Continued)

(51) Int. Cl.
*G06N 5/04* (2006.01)
*G06N 3/00* (2006.01)
*G06Q 30/00* (2012.01)
*G06F 40/35* (2020.01)

(52) U.S. Cl.
CPC .............. *G06N 5/04* (2013.01); *G06F 40/35* (2020.01); *G06N 3/006* (2013.01); *G06Q 30/01* (2013.01)

(58) Field of Classification Search
None
See application file for complete search history.

(56) References Cited

U.S. PATENT DOCUMENTS

| | | | |
|---|---|---|---|
| 6,658,393 B1 | 12/2003 | Basch et al. | |
| 7,266,537 B2 | 9/2007 | Jacobsen et al. | |

(Continued)

FOREIGN PATENT DOCUMENTS

WO    WO2002015454    2/2002

OTHER PUBLICATIONS

Sordoni, A. et al., "A hierarchical recurrent encoder-decoder for generative context-aware query suggestion," Proc. of the 24th ACM Intl. Conf. on Information and Knowledge Management (2015) pp. 553-562. (Year: 2015).*

(Continued)

*Primary Examiner* — Brian M Smith
(74) *Attorney, Agent, or Firm* — Lee & Hayes, P.C.

(57) ABSTRACT

A heuristic engine includes capabilities to collect an unstructured data set and a set of question and answer sets that allow prediction of a subsequent question by a customer. By improving prediction of a subsequent customer question the heuristic engine may improve the efficiency of customer service interactions. The heuristic engine may improve and learn by providing actual interaction sets with correlations associated with the predicted outcomes.

20 Claims, 9 Drawing Sheets

Related U.S. Application Data 29, 2016, provisional application No. 62/368,525, filed on Jul. 29, 2016, provisional application No. 62/368,536, filed on Jul. 29, 2016, provisional application No. 62/368,572, filed on Jul. 29, 2016, provisional application No. 62/368,588, filed on Jul. 29, 2016, provisional application No. 62/337,711, filed on May 17, 2016, provisional application No. 62/335,374, filed on May 12, 2016.

(56) References Cited

U.S. PATENT DOCUMENTS

| | | | |
|---|---|---|---|
| 7,765,557 | B2 | 7/2010 | Young |
| 7,870,431 | B2 | 1/2011 | Cirne et al. |
| 8,019,678 | B2 | 9/2011 | Wright et al. |
| 8,117,097 | B2 | 2/2012 | Abbott |
| 8,135,633 | B1 | 3/2012 | LeBaron et al. |
| 8,217,396 | B2 | 7/2012 | Yamazaki et al. |
| 8,271,396 | B2 | 9/2012 | Ronning et al. |
| 8,560,390 | B2 | 10/2013 | Higgins et al. |
| 8,600,873 | B2 | 12/2013 | Fisher |
| 8,615,520 | B2 | 12/2013 | Fallah |
| 8,635,117 | B1 | 1/2014 | Acuna-Rohter |
| 8,649,499 | B1 * | 2/2014 | Koster ............... H04M 3/5175 379/265.06 |
| 8,688,579 | B1 | 4/2014 | Ethington et al. |
| 8,732,023 | B2 | 5/2014 | Mikurak |
| 8,775,299 | B2 | 7/2014 | Achanta et al. |
| 8,781,962 | B2 | 7/2014 | Vasten |
| 8,811,711 | B2 | 8/2014 | Calman et al. |
| 8,826,155 | B2 | 9/2014 | Dixon et al. |
| 8,838,474 | B2 | 9/2014 | Macy et al. |
| 8,838,491 | B2 | 9/2014 | Erbey et al. |
| 8,842,331 | B1 | 9/2014 | Enge |
| 8,885,963 | B2 | 11/2014 | Coleman |
| 8,892,461 | B2 | 11/2014 | Lau et al. |
| 8,996,411 | B2 | 3/2015 | Thomas |
| 9,117,117 | B2 | 8/2015 | Macciola et al. |
| 9,349,145 | B2 | 5/2016 | Rozman et al. |
| 9,473,634 | B1 | 10/2016 | Ouimette et al. |
| 9,626,453 | B2 | 4/2017 | Koerner et al. |
| 9,942,250 | B2 | 4/2018 | Stiansen et al. |
| 10,069,971 | B1 * | 9/2018 | Shaw ................ H04M 3/5133 |
| 10,489,861 | B1 | 11/2019 | Ross et al. |
| 10,504,029 | B2 | 12/2019 | Edelen et al. |
| 2002/0194117 | A1 | 12/2002 | Nabe et al. |
| 2003/0074328 | A1 | 4/2003 | Schiff et al. |
| 2004/0036961 | A1 | 2/2004 | McGuire |
| 2004/0039691 | A1 | 2/2004 | Barratt et al. |
| 2005/0091524 | A1 | 4/2005 | Abe et al. |
| 2006/0212386 | A1 | 9/2006 | Willey et al. |
| 2006/0253468 | A1 | 11/2006 | Ramsey et al. |
| 2006/0253578 | A1 | 11/2006 | Dixon et al. |
| 2006/0256953 | A1 | 11/2006 | Pulaski et al. |
| 2006/0265090 | A1 | 11/2006 | Conway et al. |
| 2007/0168285 | A1 | 7/2007 | Girtakovskis et al. |
| 2008/0255891 | A1 | 10/2008 | Stone |
| 2009/0049550 | A1 | 2/2009 | Shevchenko |
| 2009/0064323 | A1 | 3/2009 | Lin |
| 2009/0254971 | A1 | 10/2009 | Herz et al. |
| 2010/0017263 | A1 | 1/2010 | Zernik et al. |
| 2010/0076994 | A1 | 3/2010 | Soroca et al. |
| 2010/0222053 | A1 | 9/2010 | GirisSinivasaRao et al. |
| 2010/0332287 | A1 | 12/2010 | Gates et al. |
| 2010/0332500 | A1 | 12/2010 | Pan et al. |
| 2011/0047071 | A1 | 2/2011 | Choudhuri et al. |
| 2011/0071857 | A1 | 3/2011 | Malov et al. |
| 2011/0131125 | A1 | 6/2011 | Lawrence et al. |
| 2011/0178901 | A1 | 7/2011 | Imrey et al. |
| 2011/0191250 | A1 | 8/2011 | Bishop et al. |
| 2011/0225138 | A1 | 9/2011 | Johnston |
| 2011/0258049 | A1 | 10/2011 | Ramer et al. |
| 2011/0262536 | A1 | 10/2011 | Jordan et al. |
| 2011/0295722 | A1 | 12/2011 | Reisman |
| 2011/0306028 | A1 | 12/2011 | Galimore |
| 2011/0307258 | A1 | 12/2011 | Liberman et al. |
| 2012/0116972 | A1 | 5/2012 | Walker |
| 2012/0158541 | A1 | 6/2012 | Ganti et al. |
| 2012/0158572 | A1 | 6/2012 | Dorai et al. |
| 2012/0158573 | A1 | 6/2012 | Crocker |
| 2012/0158574 | A1 | 6/2012 | Brunzell et al. |
| 2012/0259722 | A1 | 10/2012 | Mikurak |
| 2012/0262461 | A1 | 10/2012 | Fisher et al. |
| 2013/0018796 | A1 | 1/2013 | Kolhatkar et al. |
| 2013/0282430 | A1 | 10/2013 | Kannan et al. |
| 2013/0297412 | A1 | 11/2013 | Batra et al. |
| 2014/0006166 | A1 | 1/2014 | Chiang et al. |
| 2014/0081832 | A1 | 3/2014 | Merrill et al. |
| 2014/0189829 | A1 | 7/2014 | McLachlan et al. |
| 2014/0214654 | A1 | 7/2014 | Greenbaum et al. |
| 2014/0222631 | A1 | 8/2014 | Love et al. |
| 2014/0236829 | A1 | 8/2014 | Ganti |
| 2014/0249872 | A1 | 9/2014 | Stephan et al. |
| 2014/0270145 | A1 | 9/2014 | Erhart et al. |
| 2014/0278839 | A1 | 9/2014 | Lynam et al. |
| 2014/0324564 | A1 | 10/2014 | Walker et al. |
| 2014/0337083 | A1 | 11/2014 | Goyal et al. |
| 2015/0106265 | A1 | 4/2015 | Stubblefield et al. |
| 2015/0117747 | A1 | 4/2015 | Smith et al. |
| 2015/0142595 | A1 | 5/2015 | Acuna-Rohter |
| 2015/0142713 | A1 | 5/2015 | Gopinathan et al. |
| 2015/0178371 | A1 * | 6/2015 | Seth ............... G06F 16/3329 707/748 |
| 2015/0201077 | A1 | 7/2015 | Konig et al. |
| 2015/0235240 | A1 | 8/2015 | Chang et al. |
| 2015/0254719 | A1 | 9/2015 | Barfield, Jr. et al. |
| 2015/0278944 | A1 | 10/2015 | Searson et al. |
| 2015/0287026 | A1 | 10/2015 | Yang et al. |
| 2016/0042359 | A1 | 2/2016 | Singh |
| 2016/0044054 | A1 | 2/2016 | Stiansen et al. |
| 2016/0055184 | A1 * | 2/2016 | Fokoue-Nkoutche ..................... G06F 16/213 707/809 |
| 2016/0080485 | A1 | 3/2016 | Hamedi |
| 2016/0098705 | A1 | 4/2016 | Kurapati |
| 2016/0132886 | A1 | 5/2016 | Burke et al. |
| 2016/0179877 | A1 * | 6/2016 | Koerner ............... G06F 16/243 707/721 |
| 2016/0180726 | A1 | 6/2016 | Ahuja et al. |
| 2016/0225076 | A1 | 8/2016 | Merrill et al. |
| 2016/0247068 | A1 | 8/2016 | Lin |
| 2016/0373891 | A1 | 12/2016 | Ramer et al. |
| 2017/0004408 | A1 | 1/2017 | Edelen et al. |
| 2017/0032466 | A1 * | 2/2017 | Feldman ............... G06F 16/248 |
| 2017/0041464 | A1 | 2/2017 | Sharma |
| 2017/0236125 | A1 | 8/2017 | Guise et al. |
| 2017/0289168 | A1 | 10/2017 | Bar et al. |

OTHER PUBLICATIONS

Tyler, S. et al., "Large scale query log analysis of re-finding," Proc. of the 3rd ACM Intl. Conf. on Web Search and Data Mining (2010) pp. 191-200. (Year: 2010).*

Madaan, R. et al., "A data mining approach to predict users' next question in QA system," 2015 @nd Intl. Conf. on Computing for Sustainable Global Development (2015) pp. 211-215. (Year: 2015).*

Ng'ambi, D., "Pre-empting user questions through anticipation—data mining FAQ lists," Proc. of the 2002 Annual Research Conf. of the South African Inst. of Computer Scientists and Infor. Technologists on Enablement through Technology (2002) pp. 101-109. (Year: 2002).*

BODI, P. et al., "Query suggestions using query-flow graphs," Proc. of the 2009 Workshop on Web Search Click Data (2009) pp. 56-63. (Year: 2009).*

Jeffords, et. al., "New Technologies to Combat Check Fraud", The CPA Journal, Mar. 1999, pp. 30-35.

Non Final Office Action dated Apr. 15, 2020 for U.S. Appl. No. 15/495,716 "Process Re-Design Targeting Engine" Flowers, 31 pages.

Non Final Office Action dated Apr. 29, 2020 for U.S. Appl. No. 15/495,724 "Financial Literacy Mentoring Assistant Engine" Flowers, 9 pages.

(56) References Cited

OTHER PUBLICATIONS

Non Final Office Action dated May 1, 2020 for U.S. Appl. No. 15/495,549 "Heuristic Identity Authentication Engine" Flowers, 13 pages.
Bishop, "Pattern Recognition and Machine Learning", Springer Science, 2006, 758 pages.
Jaroslav, et. al., "Internal Model of Commercial Bank as an Instrument for Measuring Credit Risk of the Borrower in Relation to Financial Performance (Credit Scoring and Bankruptcy Models)", Journal of Competitiveness, Iss. 4, 2011, pp. 104-120.
Final Office Action dated Jan. 22, 2020 for U.S. Appl. No. 15/495,743 "Heuristic Sales Agent Training Assistant" Flowers, 9 pages.
Final Office Action dated Jan. 7, 2020 for U.S. Appl. No. 15/495,699 "Book of Business Impact Assessment Engine" Flowers, 26 pages.
Office Action for U.S. Appl. No. 15/495,603, dated Dec. 9, 2019, Flowers,"Heuristic Money Laudering Detection Engine", 20 Pages.
Final Office Action dated Nov. 5, 2020 for U.S. Appl. No. 15/495,699, "Book of Business Impact Assessment Engine", Flowers, 22 pages.
Final Office Action dated Sep. 24, 2020 for U.S. Appl. No. 15/495,716, "Process Re-Design Targeting Engine", Flowers, 32 pages.
Non Final Office Action dated Oct. 9, 2020 for U.S. Appl. No. 15/495,579, "Heuristic Context Prediction Engine", Flowers, 11 pages.
Non Final Office Action dated Oct. 30, 2020 for U.S. Appl. No. 15/495,594, "Natural Language Virtual Assistant", Flowers, 28 pages.
Cooper, et al., "An Evaluation of Machine-Learning Methods for Predicting Pneumonia Mortality" Artificial Intelligence in Medicine, vol. 9, Oct. 14, 1997, pp. 107-138.
Kingston, et al., "Towards a Financial Fraud Ontology: A Legal Modelling Approach", Artificial Intelligence and Law, (2004) 12 : DOI 10.1007/s10506-0005-4163-0, Springer 2006, pp. 419-446.
Kotsiantis, et al., "Efficiency of Machine Learning Teghniques in Bankrupty Prediction", 2nd International Conference on Enterprise Systems and Accounting, Jul. 11-12, 2005, Thessaloniki, Greece, pp. 39-49.
Final Office Action dated Aug. 24, 2020 for U.S. Appl. No. 15/495,549, "Heuristic Identity Authentication Engine", Flowers, 17 pages.
Final Office Action dated Aug. 24, 2020 for U.S. Appl. No. 15/495,724, "Financial Literacy Mentoring Assistant Engine", Flowers, 13 pages.
Non Final Office Action dated Sep. 4, 2020 for U.S. Appl. No. 15/495,743, "Heuristic Sales Agent Training Assistant", Flowers, 8 pages.
Final Office Action dated May 26, 2020 for U.S. Appl. No. 15/495,603 "Heuristic Money Laudering Detection Engine" Flowers, 12 pages.
Non Final Office Action dated May 29, 2020 for U.S. Appl. No. 15/495,699 "Book of Business Impact Assessment Engine" Flowers, 14 pages.
Zask, "Finding Financial Fraudsters: Quantitative and Behavioural Finance Approaches", Journal of Securities Operations & Custody, vol. 6, No. 4, 10, Mar. 2014, pp. 308-324.
Office Action dated Mar. 25, 2021 for U.S. Appl. No. 15/495,699, "Book of Business Impact Assessment Engine", Flowers, 26 pages.
Office Action for U.S. Appl. No. 15/495,549, dated Apr. 30, 2021, Flowers, "Heuristic Identity Authentication Engine", 12 Pages.
Final Office Action dated Jan. 13, 2021 for U.S. Appl. No. 15/495,743, "Heuristic Sales Agent Training Assistant", Flower, 11 pages.
Alzoubi, et al, "The Impact of Business Process Management on Business Performance Superiority", 4 International Journal of Business and Management Review, vol. 3, No. 2, Feb. 2015, 19 pgs.
Office Action for U.S. Appl. No. 15/495,594, dated May 27, 2021, Flowers, "Natural Language Virtual Assistant", 24 Pages.
Office Action for U.S. Appl. No. 15/495,716, dated May 27, 2021, Flowers, "Process Re-Design Targeting Engine", 37 Pages.

* cited by examiner

NATURAL LANGUAGE TROUBLESHOOTING ENGINE

CROSS-REFERENCE TO RELATED APPLICATIONS

This application claims the benefit of U.S. Provisional Patent Application Nos. 62/337,711 and 62/335,374, filed respectively on May 12, 2016 and May 17, 2016, and U.S. Provisional Application Nos. 62/368,448, 62/368,406, 62/368,359, 62/368,588, 62/368,572, 62/368,548, 62/368,536, 62/368,525, 62/368,512, 62/368,503, 62/368,332, 62/368,298, 62/368,271, filed on Jul. 29, 2016, the disclosures of which are hereby incorporated herein by reference.

FIELD OF THE INVENTION

The disclosure generally relates to systems, methods, apparatus, and non-transitory computer readable media for using heuristic algorithms to predict question and answer sets using natural language inputs.

BACKGROUND

Organizations involved in customer service activities often process large amounts of unstructured data to make decisions while interacting with a customer in real-time. For example, in the case of a customer service representative speaking on the telephone with a customer experiencing an issue with a product or service, appropriate solutions may include a combination of timeliness of response and accuracy in content.

Such unstructured data may include voluminous transaction records spanning decades, unstructured customer service data, or real-time transcripts of customer service interactions with scattered contextual indicators. To reasonably expect a customer service representative to effectively leverage such large data sets in real-time places an unreasonable burden on a customer service representative. However, failing to do so robs the customer service representative of vital context not readily apparent, and the wealth of knowledge gained throughout the history of an organization that would otherwise need to be distilled to briefing materials and expensively trained over time. Thus, organizations may value tools to rapidly process large data sets, to infer context, suggest lessons learned based upon transaction data, while learning through successive process iterations. Furthermore, appropriate application of such tools may provide a competitive advantage in a crowded and competitive customer service industry.

In an effort to automate and provide better predictability of customer service experiences, many organizations develop customer relationship management (CRM) software packages. Organizations that develop these software packages often develop custom solutions, at great expense, to best meet the needs of their customers in unique industries. Such tools while providing a great level of detail for the customer service representative, lack the flexibility to react to changing business conditions or fully exploit the underlying technology, driving additional cost into an already expensive solution.

Some organizations where able to make concessions on customized solutions turn to off-the-shelf or commercially available software solutions that reduce the overall cost of implementation. Such solutions may provide customer service representative prompting tools with question and answer formats that allow for consistency of customer experience, however, at the expense of a less personalized experience required in many industries. While more flexible than fully-custom solutions, the impersonal question-answer format of customer interaction may not improve without costly software revisions, rarely performed by original equipment manufacturers (OEMs) of off-the-shelf solutions.

The ability for a customer service experience to learn and improve over successive iterations remains paramount for organizations to offer discriminating customer service experiences. Often the burden of continual improvement falls to the customer service representative, as a human being able to adapt and learn to changing conditions more rapidly even within the confines of a rigid customer service software application. However, with the advent of outsourcing prevalent in the customer service industry, the customer service representative may lack much of the necessary context required to provide high levels of relevant customer service. This lack of context in an interconnected company is less an issue of distance and more an issue of data access and the ability to contextually process data to present relevant solutions in a timely manner.

SUMMARY

One exemplary embodiment includes a computer-implemented method, executed with a computer processor, to predict a current and subsequent context. The method may include retrieving an un-structured website history transaction data set stored in a first memory, receiving a unique customer identifier, accessing a heuristic algorithm, and/or executing the algorithm using the data set and the identifier. The algorithm may output a correlation score associated with at least one user and predict the current context using at least one correlation score, calculate a predicted question using the current context, and/or update the algorithm using the subsequent context. The method may include additional, less, or alternate actions, including those discussed elsewhere herein.

Yet another exemplary embodiment includes a computer-implemented method, executed with a computer processor, that generates a predicted subsequent context using a chat window that includes retrieving an un-structured transaction set correlating questions and answers stored in a first memory, receiving a natural language input from a chat window from a customer, and/or accessing and executing a heuristic algorithm to generate the predicted subsequent context using the language input and the data set. The embodiment includes calculating a predicted question using the predicted subsequent context, receiving an actual customer question with a human machine interface, and/or updating the algorithm using a calculated correlation between the actual customer question and the predicted question. The method may include additional, less, or alternate actions, including those discussed elsewhere herein.

An alternative embodiment includes a computer-implemented method, executed with a computer processor, that generates a predicted subsequent customer question and suggested answers. The method may include retrieving an un-structured transaction set correlating past customer questions and/or receiving a natural language input in a customer service environment. Furthermore, the method may include accessing and executing a heuristic algorithm to generate a predicted subsequent customer question using the language input and the transaction set. Still further, the embodiment may include receiving, with the processor, an actual customer question with a human machine interface and/or updating the algorithm using a calculated correlation between the actual customer question and the predicted subsequent question. The method may include additional, less, or alternate actions, including those discussed elsewhere herein.

Another exemplary embodiment includes a computer-implemented method, executed with a computer processor, that generates an agent training suggestion using a natural language input and an unstructured agent transaction record. The method may include retrieving an un-structured agent transaction record and receiving a natural language input. The method may include accessing and executing a heuristic algorithm to generate the agent training suggestion using the transaction record and the natural language input. Furthermore, the method may include receiving an indication of agent behavior modification and/or updating the algorithm using a calculated correlation between the suggestion and the indication. The method may include additional, less, or alternate actions, including those discussed elsewhere herein.

Exemplary embodiments may include computer-implemented methods that may in other embodiments include apparatus configured to implement the method, and/or non-transitory computer readable mediums comprising computer-executable instructions that cause a processor to perform the method.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Various embodiments of the present disclosure include the collection of unstructured data sets together with a current context. Heuristic algorithms processing these unstructured data sets together the context may allow calculation of a future context, and the presentation of context relevant data that improves over time. By subsequently training the heuristic algorithm with the outcome of a current and future predicted context, and the relevance of presented data, the heuristic algorithm may improve its efficiency as the unstructured data set grows.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Context Prediction

Figure 1:
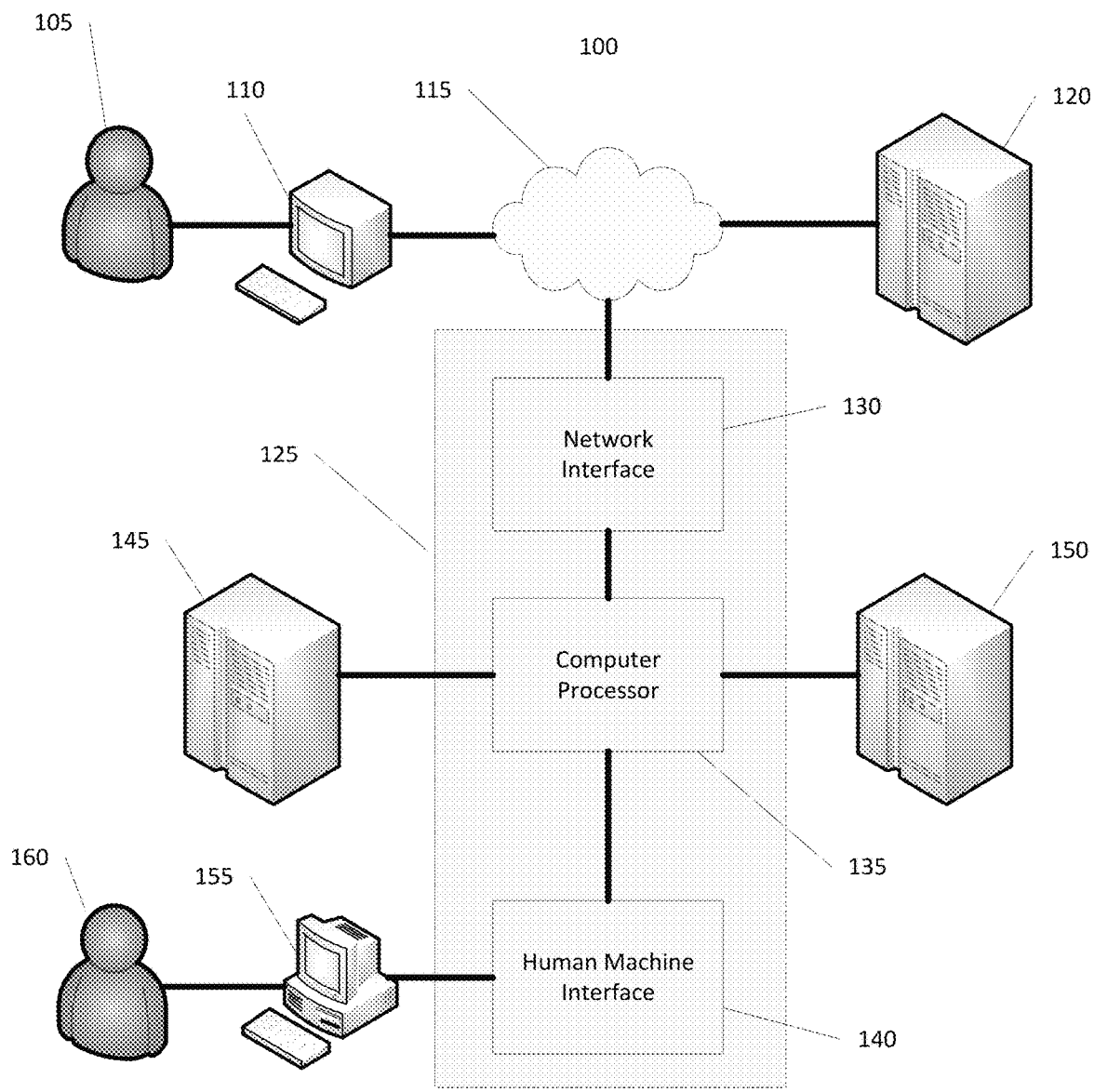
FIG. 1 illustrates an exemplary computer system to predict a context in accordance with one aspect of the present disclosure.
Figure 2:
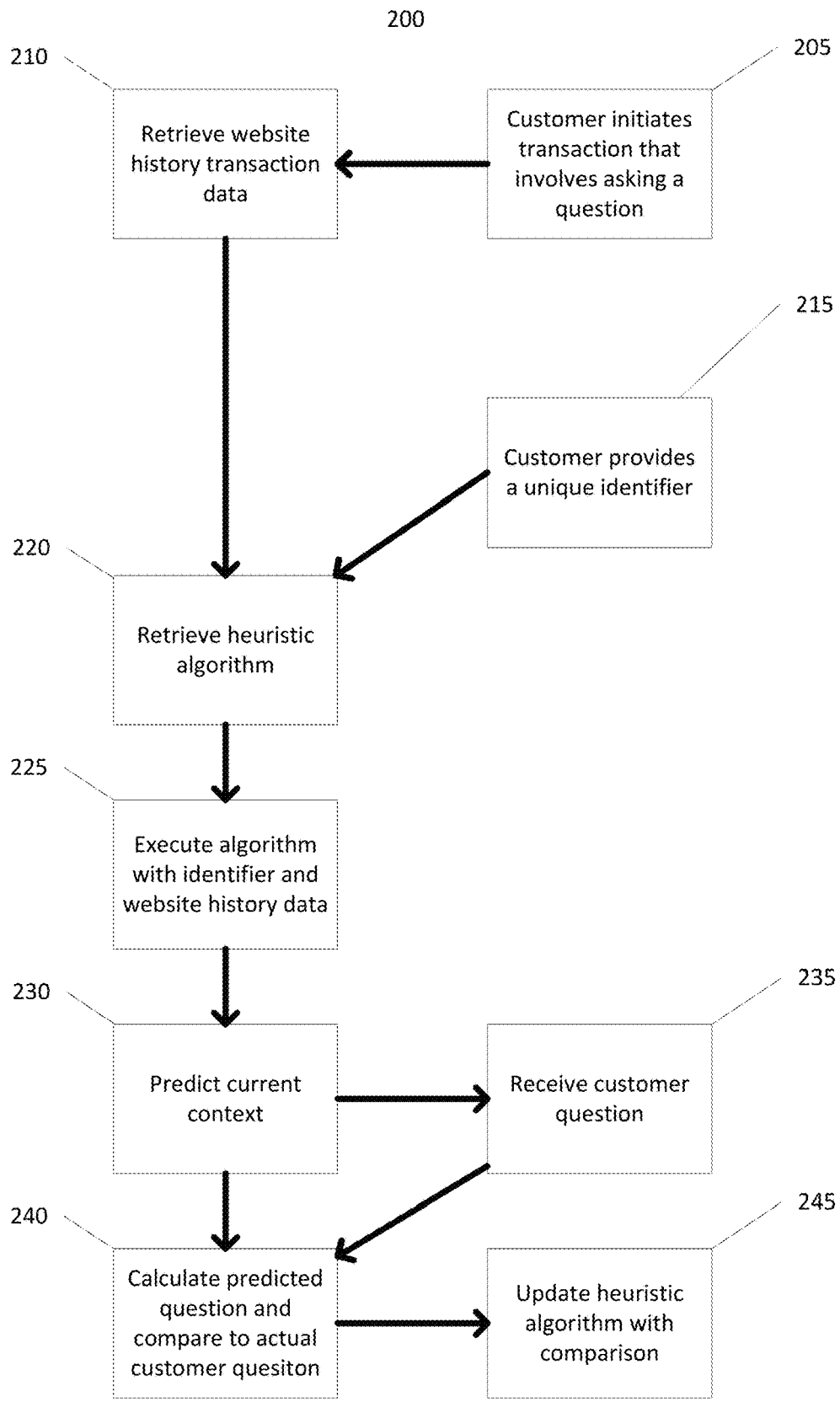
FIG. 2 illustrates an exemplary computer-implemented method to predict a context in accordance with one aspect of the present disclosure.

FIG. 1 illustrates a block diagram of an exemplary computer system 100 to predict a current and subsequent context. The exemplary system 100 enables a user 105 to interface with a user terminal 110 to initiate a transaction that involves asking a question. Such a request may, in one embodiment, involve an earlier initiation by a customer service representative 160, interacting with a service terminal 155. In another embodiment, the transaction may result from a user initiated request, absent the representative 160.

In the exemplary embodiment illustrated in FIG. 1, the user terminal 110 interfaces through a network 115 to a network interface 130 and a network server 120, such as via wireless communication or data transmission over one or more radio links or wireless, digital communication channels. The network 115 may include any of a variety of local or wire-area networks, for example the Internet, or a corporate intranet with access controls. The network interface 130 may provide interfaces and translation capabilities allowing a processor 135 to communicate using a variety of network protocols, among a variety of network layers, in parallel and serially.

A human-machine interface 140, together with the network interface 130, and the processor 135, may comprise a heuristic engine 125, in one embodiment. In another embodiment, the heuristic engine 125 may include additional components, for example memory devices, processing engines, and interfaces, not illustrated, to perform required functions. The processor 135 may include interfaces to a heuristic server 145 and transaction server 150, according to one embodiment. The human-machine interface 140 may include interfaces to the service terminal 155 used by the customer service representative 160.

Figure 4:
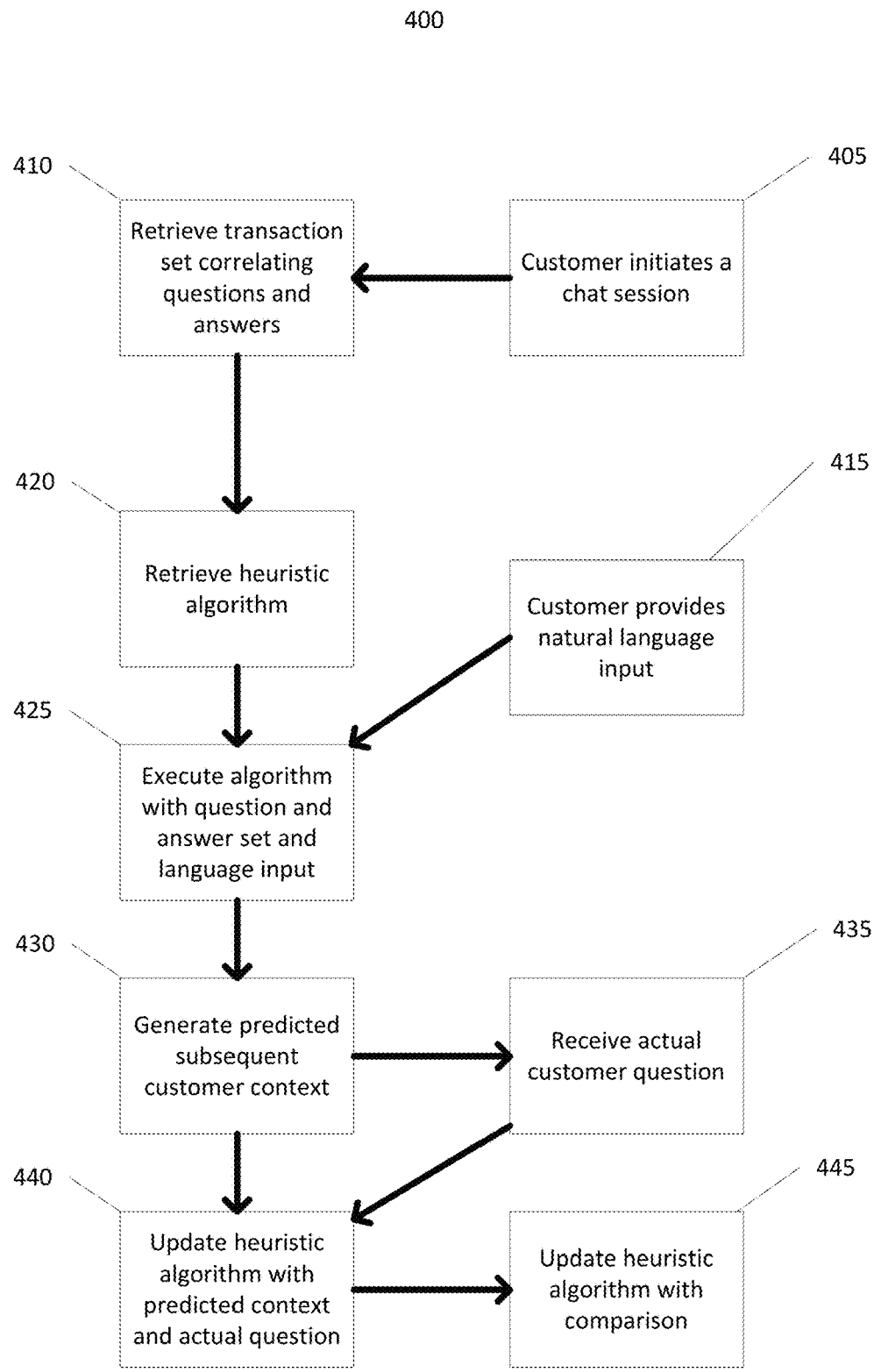
FIG. 4 illustrates an exemplary computer-implemented method to predict a context with a chat window in accordance with one aspect of the present disclosure.

In accordance with one aspect of the present disclosure, the system 100 may perform the method 200, as illustrated in FIG. 4. However, the method 200 does not specifically require the system 100, or the elements included therein in a particular arrangement, to perform the method steps illustrated in the process 200.

The exemplary method 200 includes (block 205) a customer, for example the customer 105 in FIG. 1, initiates a transaction that involves asking a question. The heuristic engine 125 of FIG. 1, may in one embodiment, retrieve website transaction data (block 210), for example from the server 120 using a SQL database request, or otherwise as appropriate given the specific implementation of the server 120. In one embodiment of the present disclosure, the customer 105 may provide a unique identifier, for example in the form of a caller-id telephone number, or internet address, such as an IP address, MAC address, transaction identifier, or other identifier that uniquely identifies a user over a telecommunications network, such as the network 115 in FIG. 1. The processor 125 may retrieve a heuristic algorithm from, for example, the heuristic server 145 (block 220). The heuristic algorithm may in one embodiment, include a commercially available heuristic algorithm, for example, the Watson algorithm, a cognitive heuristic algorithm, commercially available from the International Business Machines Corporation. Such an algorithm may, in one embodiment, reside within the heuristic server 145 in machine executable instructions, specific to the processor 135. In another embodiment, the heuristic algorithm may reside within the heuristic server 145 as compiled object code, or un-compiled source code.

The processor 135 may execute the algorithm with the unique identifier and the transaction data (block 225). In one embodiment, the processor 135 may include compilation and linking steps necessary to translate object code or source code into machine executable instructions appropriate for the processor 135 at run-time, or at a time prior to required execution. The processor may predict a current context for the customer 105 (block 230), such as classifying the customer into a particular category based upon product type, or otherwise. In one embodiment (block 235), the processor 135 may receive a customer question, for example from the terminal 110, through the network 115, translated by the network interface 130. Using the predicted context, and the customer question, the processor 135 may (block 240) calculate a predicted question from which to compare the actual question. Providing the heuristic algorithm the results of such a comparison (block 245), allows in one embodiment the training or learning of the heuristic algorithm.

Contextual Chat Window Predictions

Figure 3:
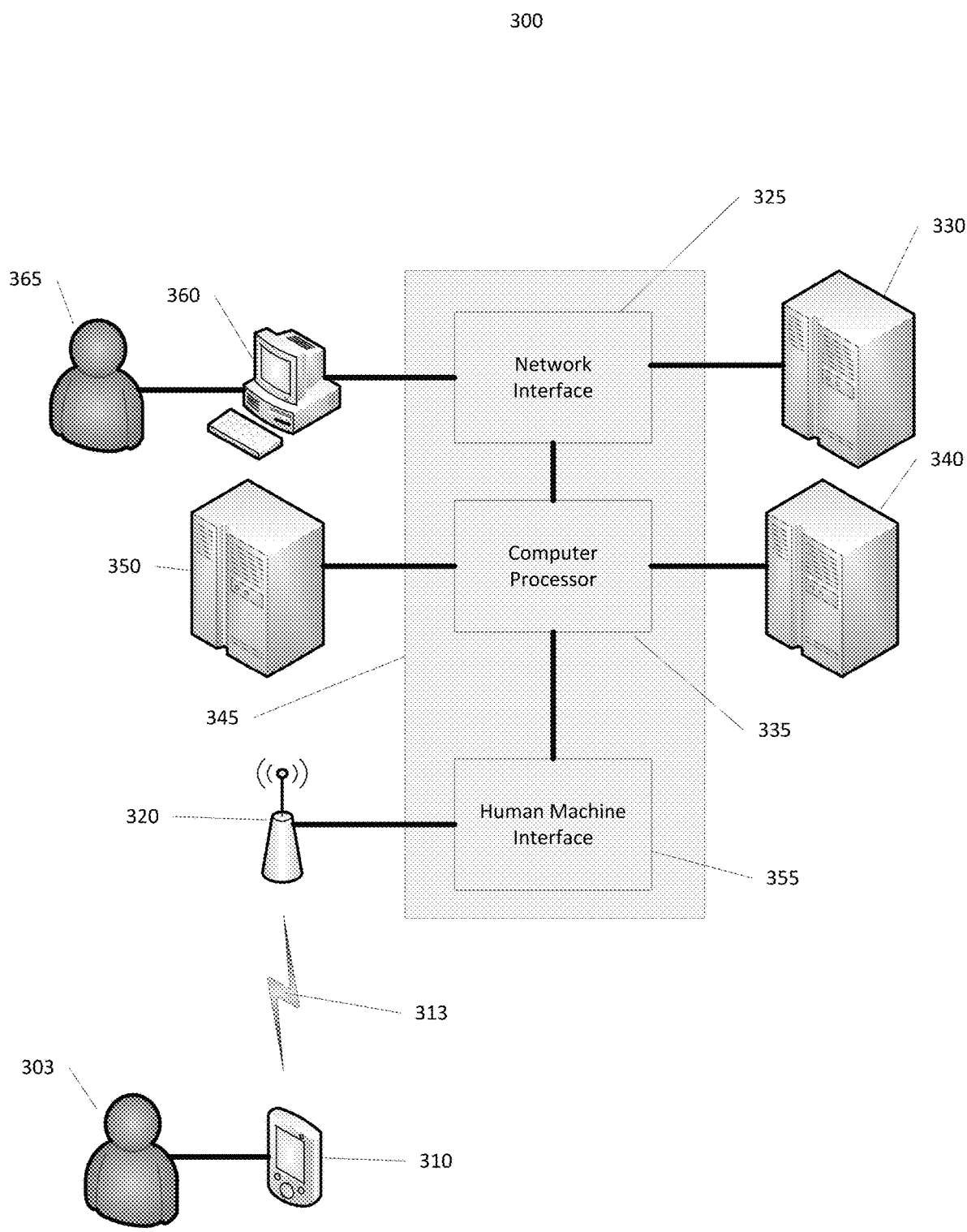
FIG. 3 illustrates an exemplary computer system to predict a context with a chat window in accordance with one aspect of the present disclosure.

FIG. 3 illustrates a block diagram of an exemplary computer system 300 to generate a predicted subsequent context using a chat window. The exemplary system 300 enables a user 305 to interface with a mobile device 310 to initiate a transaction that involves asking a question through a chat window. Such a request may, in one embodiment involve an earlier initiation by a customer service representative 365, interacting with a service terminal 360. In another embodiment, the transaction may result from a user initiated request, absent the representative 365.

The mobile device 310 may communicatively couple to a human-machine interface 355 through a wireless interface device 320, according to one embodiment. Such a wireless interface device 320 may comprise a WiFi access point, for example in accordance with IEEE Std 802.11, or any of a variety of cellular or mobile access point equipment required to translate wireless digital and analog signals into signals within a computer network. The wireless interface device 320 may in various embodiments include a plurality of interface devices within, for example a cellular data infrastructure network commercially available for consumer or business use.

The human-machine interface 355 may interface to a processor 335 disposed for example within a heuristic engine 345, together with a network interface 325, according to one embodiment of the present disclosure. Other embodiments of the heuristic engine 345 may include a variety of memory devices, interface devices, and processing devices, to execute required functions. The computer processor 335 may interface to a heuristic server 340 and a local transaction server 350, in one embodiment, and may interface to a remote transaction server 330 via the network interface 325. A customer service representative 365 may interface with a service terminal 360 to initiate and interact with the customer 305 via, for example, a chat window.

In accordance with one aspect of the present disclosure, the system 300 may perform the method 400, as illustrated in FIG. 4. However, the method 400 does not specifically require the system 300, nor do the elements included therein require a particular arrangement, to perform the method steps illustrated in the process 400.

A customer, such as the customer 305 of FIG. 3, may initiate a chat session (block 405), for example using the mobile device 310 of FIG. 3. In one embodiment, the processor 335 may retrieve a transaction set (block 410) from the transaction server 350, that correlates questions and answers. The processor 335, may retrieve a heuristic algorithm from the heuristic server 340 (block 420). The customer 305 may provide a natural language input (block 415), for example into the mobile device 310, and the processor 335 may execute the algorithm with the question and answer set, and the language input from the user. One exemplary embodiment includes the processor 335 generating a predicted subsequent context (block 430), and the processor 335 receiving an actual customer question (block 435). The processor 335 may update the algorithm with the predicted context and actual question (block 440). In another exemplary embodiment, the processor 335 may update the algorithm with a comparison of the predicted question and the actual question.

Question and Answer Prediction

Figure 5:
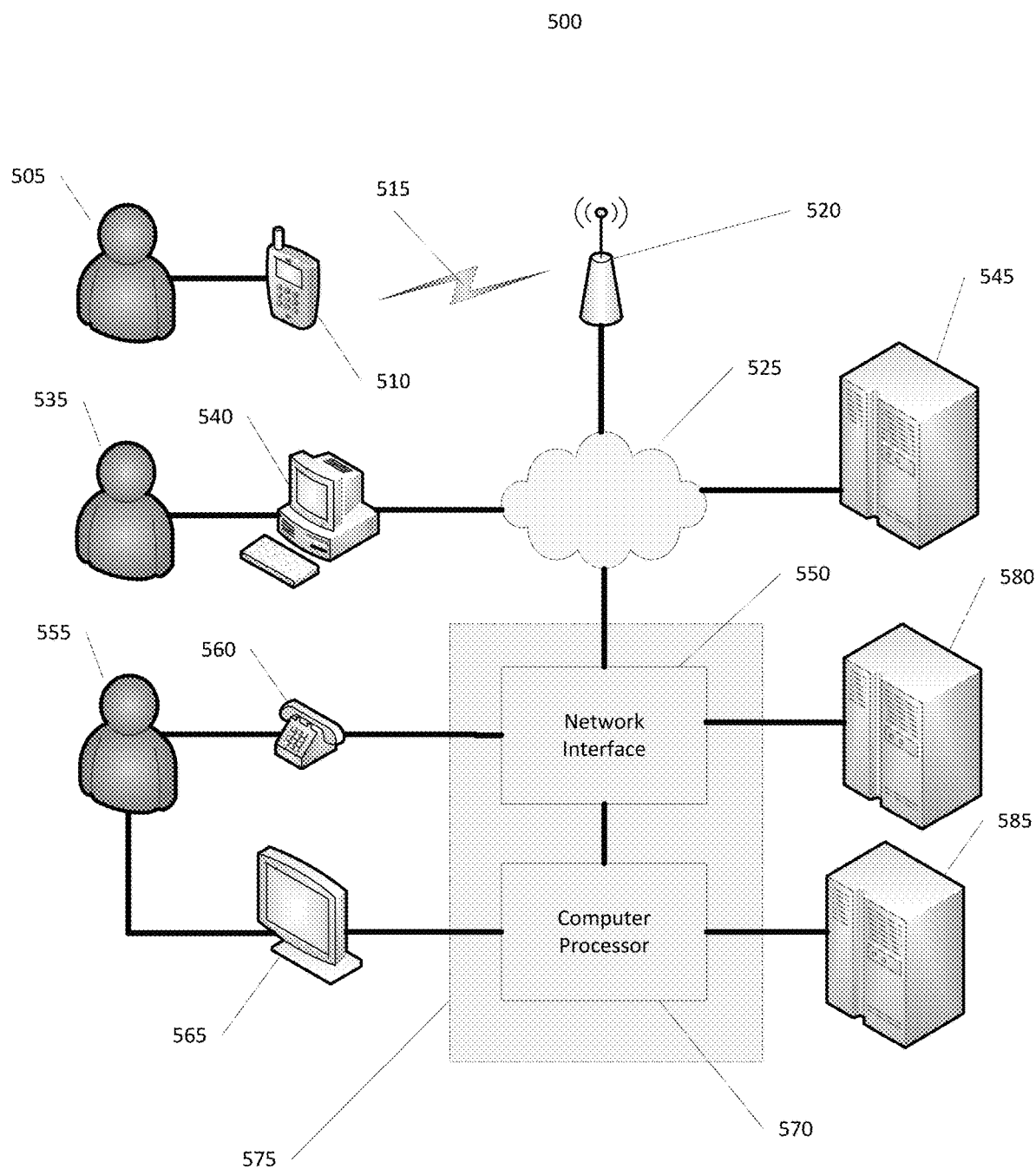
FIG. 5 illustrates an exemplary computer system to troubleshoot a system in accordance with one aspect of the present disclosure.

FIG. 5 illustrates a block diagram of an exemplary computer system 500 to use natural language inputs to prompt questions and answer sets. The exemplary system 500 enables a user 505, for example interfacing with a cellular telephone 510, to provide a natural language input over a wireless network. The cellular telephone 510 may communicate over a wireless protocol 515 through a wireless access point 520, communicatively coupled to a computer network 525. The computer network 525 may interface to a remote server 545 and a first customer service representative 535 through a customer service terminal 540. A second customer service representative, in one embodiment, may interface with a view-screen 565 and a telephone 560, that respectively communicatively couple to a computer processor 570 and a network interface 550. In one embodiment, the network interface 550 and computer processor 570 together comprise a heuristic engine 575, that interfaces to the computer network 525, a heuristic server 585, and a transaction server 580.

Figure 6:
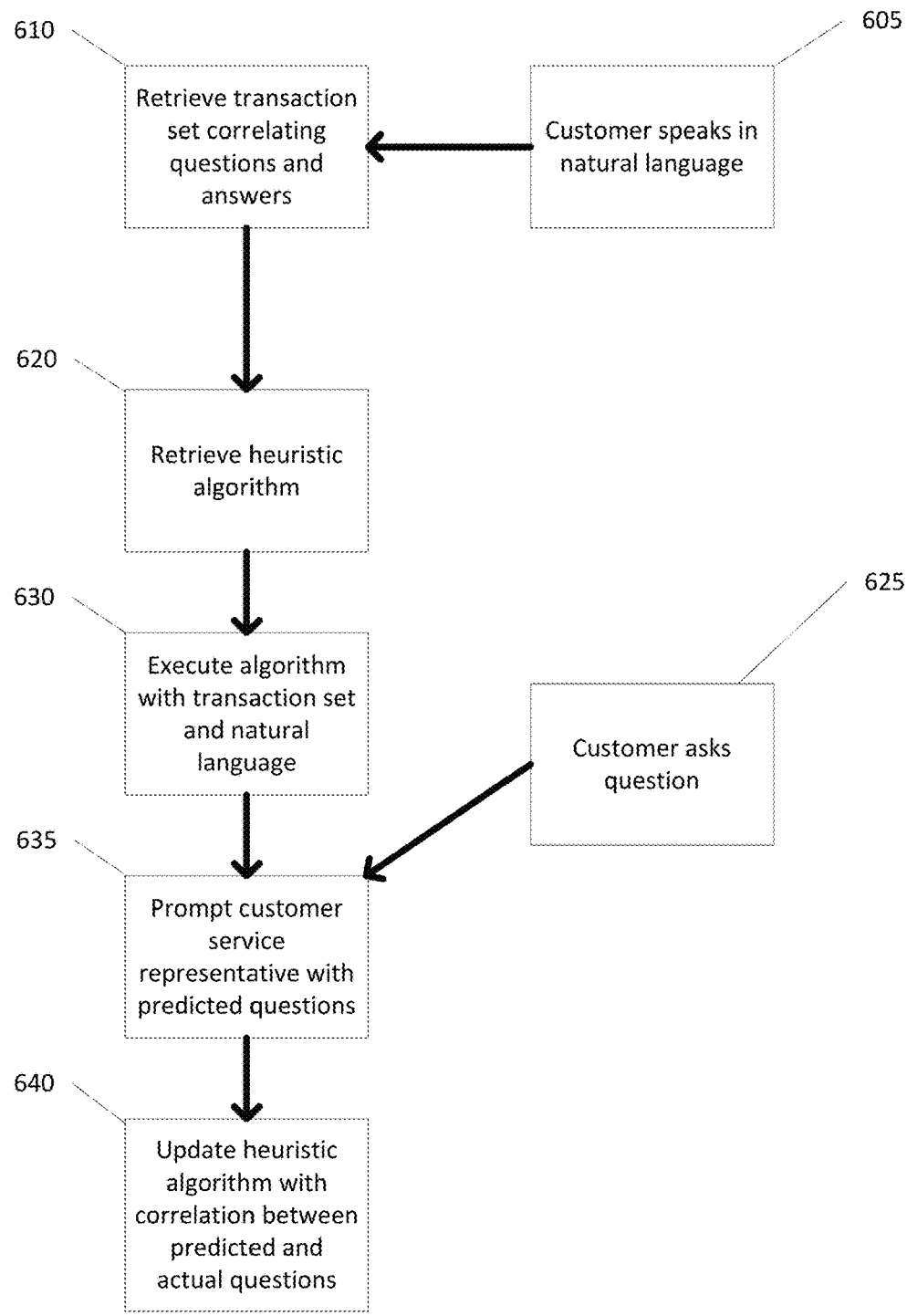
FIG. 6 illustrates an exemplary computer-implemented method to troubleshoot a system in accordance with one aspect of the present disclosure.

In accordance with one aspect of the present disclosure, the system 500 may perform the computer-implemented method 600, as illustrated in FIG. 6. However, in one embodiment, the method 600 may not, or does not, specifically require the system 500, nor do the elements included therein require a particular arrangement, to perform the method steps illustrated in the process 600.

The method 600 includes a user, for example the user 505 of FIG. 5, speaking in a natural language (block 605). The processor 570, for example, may retrieve a transaction set from the remote server 545 or the transaction server 580 (block 610). The transaction set, in one embodiment, may include correlation data between question and answer sets. The processor 570 may retrieve a heuristic algorithm, for example from the heuristic server 585 (block 620). In one exemplary embodiment, the processor 570 may execute the algorithm with the transaction set and data representing the natural language input of the user.

In accordance with one exemplary embodiment, a user or customer may (block 625) ask a question in natural language. The processor may prompt the first service representative 535, and/or second service representative 555, using the service terminal 540, viewscreen 565, and/or the telephone 560 with at least one predicted question (block 635). In one embodiment, the processor (block 570) updates the heuristic algorithm, for example in the heuristic server 585, with a correlation between a predicted question and the actual question asked (block 625).

Cause and Effect Transaction Analysis

Figure 7:
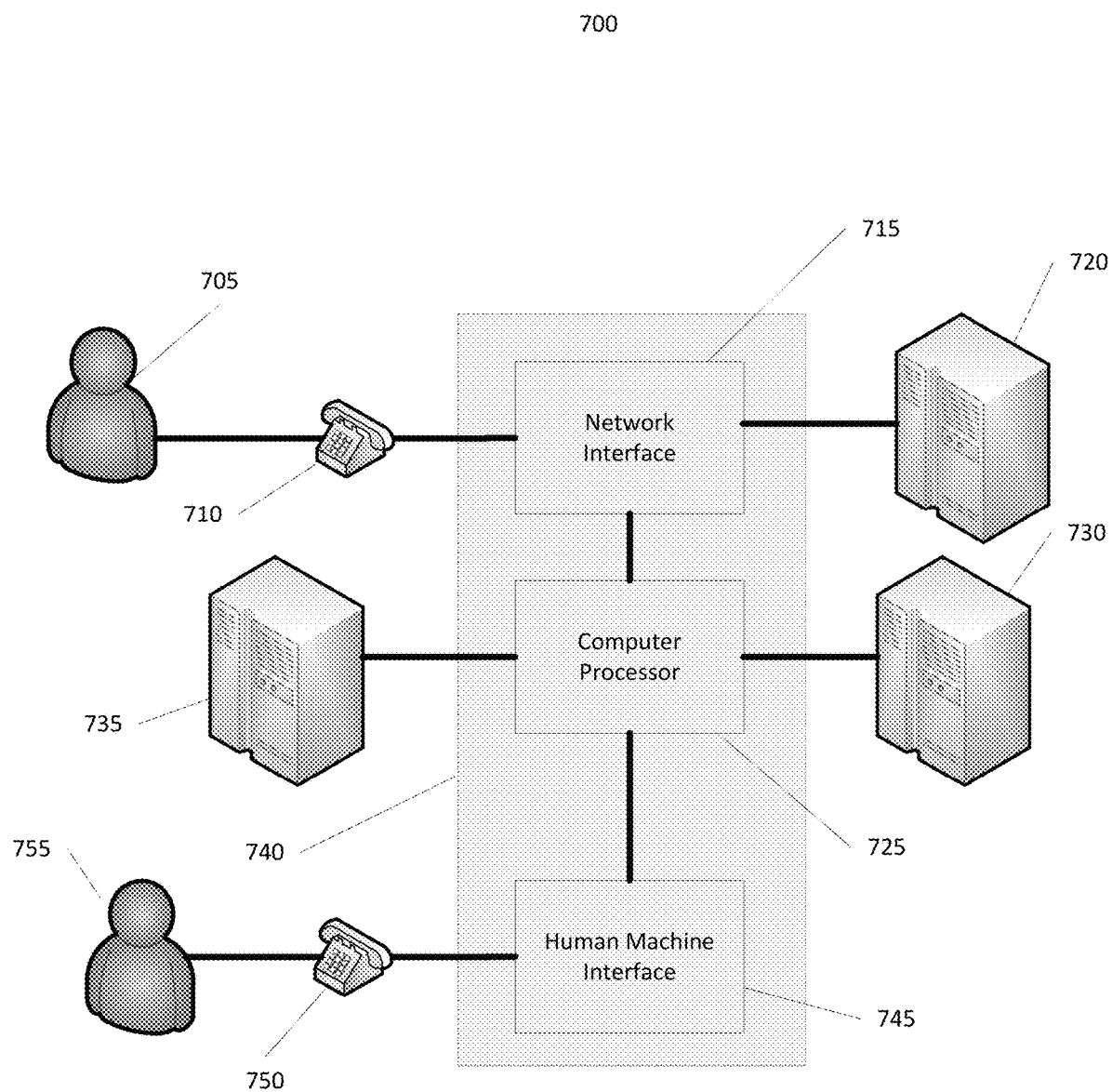
FIG. 7 illustrates an exemplary computer system to assess agent training in accordance with one aspect of the present disclosure.

FIG. 7 illustrates a block diagram of an exemplary computer system 700 to modify sales agent training based upon a cause-effect transaction analysis. The exemplary system 700 enables a user 705, using for example a telephone 750 to interface with a network interface 715. The network interface 715 may also interface with a remote server 720, and a computer processor 725. A service representative 755 may interface, in one embodiment, with a human-machine interface 745 using a telephone 750. The human-machine interface 745, a heuristic server 730, a transaction server 735, and the network interface 715 may each interface with the computer processor 725. The network interface 715, computer processor 725, and the human-machine interface 745 may comprise, in one embodiment, a heuristic engine 740. In other embodiments, the heuristic engine 735 may include a variety of memory devices, interface devices, and processing devices, to execute required functions.

Figure 8:
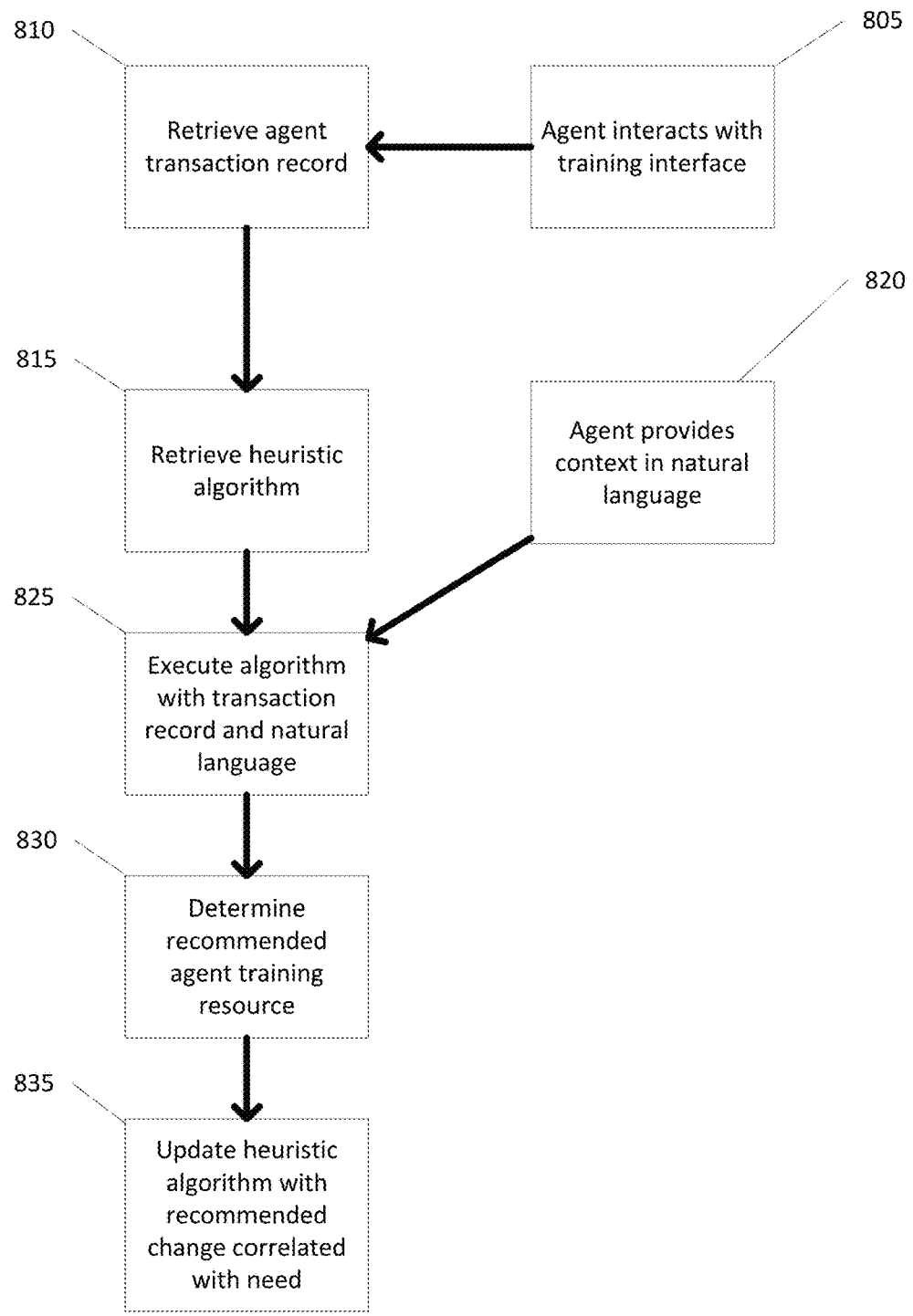
FIG. 8 illustrates an exemplary computer-implemented method to assess agent training in accordance with one aspect of the present disclosure.

In accordance with one aspect of the present disclosure, the system 700 may perform the computer-implemented method 800, as illustrated in FIG. 8. However, in one embodiment, the method 800 does not, or may not, specifically require the system 700, nor do the elements included therein require a particular arrangement, to perform the method steps illustrated in the process 800.

The method 800 includes a sales agent, or employee of an organization, such as the user 705 of FIG. 7, interacts with a training or customer service interface (block 805), for example the telephone 710 of FIG. 7. The processor 725 may retrieve at least one agent transaction record (block 810), for example from the remote server 720 or the transaction server 735. In one embodiment, the processor 725 may retrieve a heuristic algorithm from the heuristic server 730. An agent, for example the agent 705 of FIG. 7, may provide a context in natural language (block 820), for example through the telephone 710. The processor 725 may execute the algorithm with the transaction record and the natural language (block 825).

The processor may determine recommended agent training resources (block 830). In one embodiment, the processor 725 may update the heuristic algorithm, for example in the heuristic server 730, with the recommended resource, and/or change in behavior, in one embodiment correlated to business need.

Figure 9:
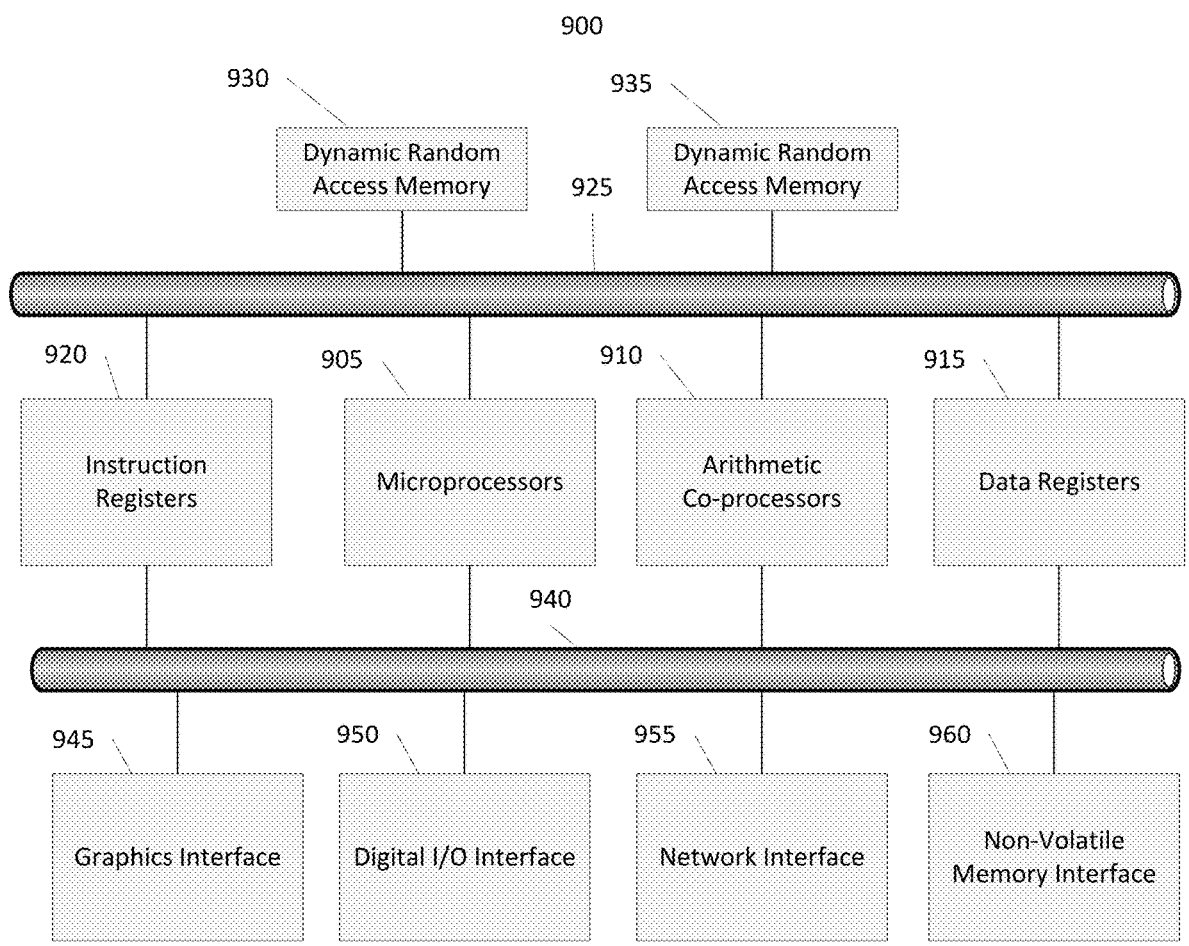
FIG. 9 illustrates an exemplary computing system to in accordance with one aspect of the present disclosure.

FIG. 9 illustrates an exemplary computing system 900 in accordance with the embodiments disclosed in FIGS. 1-8 and 10. The exemplary computing system 900 and components disclosed therein may comprise part, all, or none of the disclosed embodiments of FIGS. 1-8 and 10. The system 900 includes one or more microprocessors 905, coupled to supporting devices through multi-access busses 925 and 940. Dynamic random access memory 930 and 935 may interface to data bus 925, and store data used by the one or more microprocessors 905. The system 900 includes instruction registers 920 that store executable instructions for the one or more microprocessors 905, and data registers 915 that store data for execution. In some embodiments, the system 900 includes one or more arithmetic co-processors 910, to assist or supplement the one or more microprocessors 905.

Data bus 940 includes interfaces to a graphics interface 945 that may in some embodiments process and transmit graphical data for a user on a display or similar devices. Likewise, data bus 940 includes interfaces for a digital I/O interface that processes and transmits, for example, keyboard, pointing device, and other digital and analog signals produced and consumed by users or other machines. A network interface 955 processes and transmits encoded information over wired and wireless networks to connect the system 900 to other machines and users. Data bus 940 also includes at least one interface to a non-volatile memory interface, that may process and transmit data that resides on non-volatile memory devices.

Figure 10:
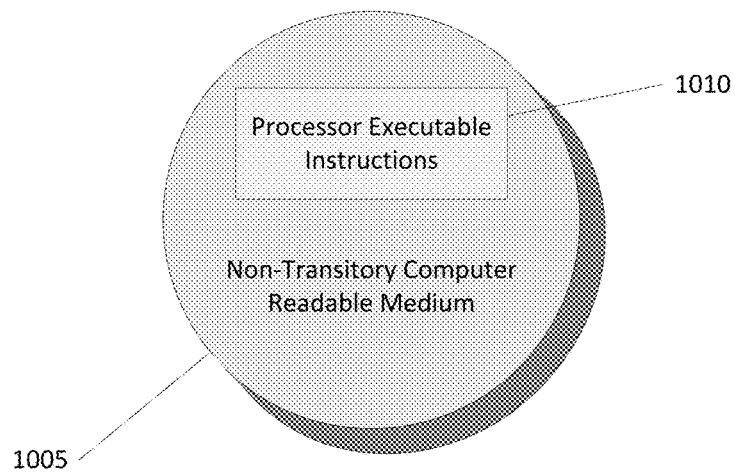
FIG. 10 illustrates an exemplary article of manufacture in accordance with one aspect of the present disclosure.

FIG. 10 illustrates a non-transitory computer readable medium 1005, that comprises processor executable instructions 1010. Such processor executable instructions may include instructions executed by the one or more processors 905 of FIG. 9.

Machine Learning and Other Matters

In certain embodiments, the heuristic engine and algorithms discussed herein may include machine learning, cognitive learning, deep learning, combined learning, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more tokenized icons from user device details, user request or login details, user device sensors, geolocation information, image data, the insurer database, a third-party database, and/or other data.

In one embodiment, a processing element (and/or heuristic engine or algorithm discussed herein) may be trained by providing it with a large sample of images and/or user data with known characteristics or features. Based upon these analyses, the processing element may learn how to identify characteristics and patterns that may then be applied to analyzing user device details, user request or login details, user device sensors, geolocation information, image data, the insurer database, a third-party database, and/or other data. For example, the processing element may learn, with the user's permission or affirmative consent, to identify the user and/or the asset that is to be the subject of a transaction, such as generating an insurance quote or claim, opening a financial account, handling a loan or credit application, processing a financial (such as a credit card) transaction or the like.

Additional Considerations

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The processors, transceivers, mobile devices, service terminals, servers, remote servers, database servers, heuristic servers, transaction servers, and/or other computing devices discussed herein may communicate with each via wireless communication networks or electronic communication networks. For instance, the communication between computing devices may be wireless communication or data transmission over one or more radio links, or wireless or digital communication channels.

Customers may opt into a program that allows them share mobile device and/or customer, with their permission or affirmative consent, with a service provider remote server. In return, the service provider remote server may provide the functionality discussed herein, including security, fraud, or other monitoring, and generate recommendations to the customer and/or generate alerts for the customers in response to abnormal activity being detected.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to improvements to computer functionality, and improve the functioning of conventional computers.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method, executed with a processor, that generates a predicted subsequent customer question and suggested answers in an insurance customer service environment, comprising:
retrieving, by the processor,
an un-structured transaction set correlating past customer questions and answers stored in a first memory, and
a training resource transaction record stored in the first memory;
receiving, by the processor and from a human machine interface, a natural language input in the insurance customer service environment;
accessing, by the processor, a heuristic algorithm stored in a second memory;
executing the heuristic algorithm, by the processor, to generate the predicted subsequent customer question using the natural language input and the un-structured transaction set;
receiving, by the processor, a customer question from the human machine interface;
updating, by the processor, the heuristic algorithm in the second memory using a calculated correlation between the customer question and the predicted subsequent customer question; and executing the updated heuristic algorithm, by the processor, to generate suggested training resources using the training resource transaction record and the calculated correlation.

2. The computer-implemented method of claim 1, wherein:
the un-structured transaction set comprises questions and answers associated with at least one account, and
the questions and answers associated with the at least one account relate to an insurance quote or an insurance claim.

3. The computer-implemented method of claim 1, wherein the un-structured transaction set relates to a recent transaction history.

4. The computer-implemented method of claim 1, wherein the predicted subsequent customer question matches the customer question.

5. The computer-implemented method of claim 1, wherein the first memory comprises an external transaction server and the second memory comprises an external heuristic server.

6. The computer-implemented method of claim 1, further comprising providing, by the processor, the predicted subsequent customer question to a device of a customer service representative for display.

7. The computer-implemented method of claim 1, further comprising:
updating, by the processor, the updated heuristic algorithm in the second memory using the suggested training resources.

8. A computer system configured to generate a predicted subsequent customer question and suggested answers in an insurance customer service environment, the computer system comprising one or more processors configured to:
retrieve an un-structured transaction set correlating past customer questions and answers stored in a first memory;
retrieve a training resource transaction record stored in the first memory;
receive, from a human machine interface, a natural language input in the insurance customer service environment;
access a heuristic algorithm stored in a second memory;
execute the heuristic algorithm to generate the predicted subsequent customer question using the natural language input and the un-structured transaction set;
receive a customer question from the human machine interface;
update the heuristic algorithm in the second memory using a calculated correlation between the customer question and the predicted subsequent customer question; and
execute the updated heuristic algorithm to generate suggested training resources using the training resource transaction record and the calculated correlation.

9. The computer system of claim 8, wherein:
the un-structured transaction set comprises questions and answers associated with at least one account, and
the questions and answers relate to an insurance quote or an insurance claim.

10. The computer system of claim 8, wherein the un-structured transaction set relates to a recent transaction history.

11. The computer system of claim 8, wherein the predicted subsequent customer question matches the customer question.

12. The computer system of claim 8, wherein the first memory comprises an external transaction server and the second memory comprises an external heuristic server.

13. The computer system of claim 8, wherein the one or more processors are further configured to provide the predicted subsequent customer question to a device of a customer service representative for display.

14. A non-transitory computer readable medium, comprising computer readable instructions that, when executed, cause a processor to perform operations comprising:
retrieving an un-structured transaction set correlating past customer questions and answers stored in a first memory;
retrieving a training resource transaction record stored in the first memory
receiving, from a human machine interface, a natural language input in an insurance customer service environment;
accessing a heuristic algorithm stored in a second memory;
executing the heuristic algorithm to generate a predicted subsequent customer question using the natural language input and the un-structured transaction set;
receiving a customer question from the human machine interface;
updating the heuristic algorithm in the second memory using a calculated correlation between the customer question and the predicted subsequent customer question; and
executing the updated heuristic algorithm to generate suggested training resources using the training resource transaction record and the calculated correlation.

15. The non-transitory computer readable medium of claim 14, wherein
the un-structured transaction set comprises questions and answers associated with at least one account,
the questions and answers relate to an insurance quote or an insurance claim, and
the insurance quote or the insurance claim resulted from a communication utilizing a customer chat window.

16. The non-transitory computer readable medium of claim 14, wherein the un-structured transaction set relates to a transaction history.

17. The non-transitory computer readable medium of claim 14, wherein the predicted subsequent customer question matches the customer question.

18. The non-transitory computer readable medium of claim 14, wherein the first memory comprises an external transaction server and the second memory comprises an external heuristic server.

19. The non-transitory computer readable medium of claim 14, wherein the operations further comprise providing the predicted subsequent customer question to a device of a customer service representative for display.

20. The non-transitory computer readable medium of claim 14, further comprising:
updating the updated heuristic algorithm in the second memory using the suggested training resources.

* * * * *

UNITED STATES PATENT AND TRADEMARK OFFICE
CERTIFICATE OF CORRECTION

PATENT NO. : 11,164,091 B1
APPLICATION NO. : 15/495678
DATED : November 2, 2021
INVENTOR(S) : Elizabeth Flowers et al.

Page 1 of 1

It is certified that error appears in the above-identified patent and that said Letters Patent is hereby corrected as shown below:

In the Specification

Column 1, Line 9, change "respectively on May 12, 2016 and May 17, 2016, and U.S." to --respectively on May 17, 2016 and May 12, 2016, and U.S.--

Signed and Sealed this
Third Day of February, 2026

John A. Squires
*Director of the United States Patent and Trademark Office*